United States Patent [19]

Van Bokhoven et al.

[11] Patent Number: 4,560,725

[45] Date of Patent: Dec. 24, 1985

[54] POLYMER COMPOSITION BASED ON A POLYCARBONATE AND A GRAFT COPOLYMER

[75] Inventors: Petrus H. M. Van Bokhoven, Sweikhuizen; Pieter J. Van Asperen, Geleen, both of Netherlands

[73] Assignee: Stamicarbon B.V., Licensing Subsidiary of DSM, Geleen, Netherlands

[21] Appl. No.: 446,420

[22] Filed: Dec. 2, 1982

[30] Foreign Application Priority Data

Dec. 2, 1981 [NL] Netherlands ......................... 8105437

[51] Int. Cl.$^4$ ................................................ C08L 69/00
[52] U.S. Cl. ........................................ 525/67; 525/71
[58] Field of Search ................... 525/67, 71, 146, 468

[56] References Cited

U.S. PATENT DOCUMENTS 3,954,905 5/1976 Margotte et al. .................... 525/310
3,988,389 10/1976 Margotte et al. ...................... 525/67

*Primary Examiner*—Theodore E. Pertilla
*Attorney, Agent, or Firm*—Cushman, Darby & Cushman

[57] ABSTRACT

Disclosed is a polymer composition based on a polycarbonate and a graft copolymer of a vinyl aromatic compound and an unsaturated nitrile comound on a rubber-like polymer. Good flow properties are achieved by a composition consisting essentially of:

A. at least one graft copolymer obtained by polymerizing 40-80 parts by weight of a monomer mixture, which mixture consists of:
  (1) 20-40 weight % of acrylonitrile, and
  (2) 60-80 weight % of styrene, in the presence of 10-25 parts by weight of a hydrocarbon rubber,
B. at least one graft copolymer obtained by polymerizing 75-90 parts by weight of a monomer mixture, which mixture consists of:
  (1) 20-40 weight % of acrylonitrile, and
  (2) 60-80 weight % of styrene, in the presence of 10-25 parts by weight of a hydrocarbon rubber,
C. a copolymer obtained by polymerizing 20-40 parts by weight of acrylonitrile with 60-80 parts by weight of styrene, and
D. at least one polycarbonate, wherein based on the weight of the composition, the total rubber content is from about 5 to about 30 weight % and the difference in rubber content between components A and B is at least 5 weight %.

Each monomer mixture used to formulate graft copolymer components A and B may additionally, based on the weight of the mixture, contain up to 20 weight % of at least one additional monomer.

6 Claims, No Drawings

POLYMER COMPOSITION BASED ON A POLYCARBONATE AND A GRAFT COPOLYMER

FIELD OF THE INVENTION

This invention relates to a polymer composition based on a polycarbonate and a graft copolymer of a vinyl aromatic compound and an unsaturated nitrile compound on a rubber.

BACKGROUND

A polymer composition of this general type is known from U.K. Patent specifications Nos. 991,422 and 1,253,266 and from the U.S. Pat. Nos. 3,988,389 and 3,954,905.

The U.K. Patent Specification No. 991,422 describes mixtures of a polycarbonate and a polymer obtained by graft polymerizing a vinyl aromatic compound and an unsaturated nitrile compound in the presence of polybutadiene. According to U.K. Patent No. 1,253,266, the heat resistance, notch impact strength, and hardness of such mixtures can be improved by incorporating therein a copolymer that contains at least 50 weight % of α-methylstyrene.

U.S. Pat. No. 3,988,389 discloses that the strength of fusion welds of mixtures formulated according to these patents can be improved by using a graft copolymer having 40–80 weight % of rubber and a mean particle size between 0.2 and 5 μm. U.S. Pat. No. 3,954,905 discloses that such improvement can also be achieved by using a graft copolymer having a mean particle size between 0.05 and 0.19 μm.

European Patent Application No. 5202 describes a polymer composition based on a polycarbonate, a first ABS graft copolymer having a rubber content of 5–50 weight %, a second ABS graft copolymer having a rubber content of 60–90 weight %, and, optionally, a copolymer. The object thereof is to provide compositions which retain their impact resistance at very low temperatures.

SUMMARY OF THE INVENTION

The aim of the present invention is to provide a polymer composition of the type described above wherein flow behavior is improved, but yet wherein other mechanical properties, such as impact strength and hardness, are retained.

The invention provides a polymer composition containing:
A. at least one graft copolymer obtained by polymerizing 40–80 parts by weight of a first monomer mixture, which mixture consists of:
  (1) 20–40 weight % of acrylonitrile, and
  (2) 60–80 weight % of styrene, in the presence of 20–60 parts by weight of a hydrocarbon rubber,
B. at least one graft copolymer obtained by polymerizing 75–90 parts by weight of a second monomer mixture, which mixture consists of:
  (1) 20–40 weight % of acrylonitrile, and
  (2) 60–80 weight % of styrene, in the presence of 10–25 parts by weight of a hydrocarbon rubber;
C. a copolymer obtained by polymerizing 20–40 parts by weight of acrylonitrile with 60–80 parts by weight of styrene; and
D. at least one polycarbonate,
wherein, based on the weight of the composition, the total rubber content is from about 5 to about 30 weight % and the difference in rubber content between components A and B is at least 5 weight %.

Each monomer mixture used to formulate the graft copolymers (components A and B) may additionally, based on the weight of the mixture, contain up to 20 weight % of at least one additional monomer, preferably chosen from the group of maleic anhydride, methyl methacrylate, vinylacetate and halogenated styrene.

The terms styrene and acrylonitrile are intended to include derivatives thereof such as α-methylstyrene and methacrylonitrile.

Surprisingly, it has now been found that such compositions exhibit good flow combined wth good impact strength (even at low temperatures), hardness, stiffness, and energy absorbed in the falling dart test. This combination of properties is particularly desirable for use in fabricating complicated products such as car components, for example dashboards and grills. An added advantage of these particular compositions is that they present no problems regarding the strength of fusion seams. As a consequence of the good flow behavior, the fusion seams exhibit ample strength and are virtually invisible.

DETAILED DESCRIPTION

In principle, any thermoplastic polycarbonate (component D) is suitable for use in formulating the moldable compositions of the invention. Polycarbonates per se are known and may be obtained, for example, by reacting dihydroxy or polyhydroxy compounds with phosgene or the diester of carbonic acid. Particularly suitable dihydroxy compounds are dihydroxydi arylalkanes, including those which contain alkyl groups or chlorine or bromine atoms ortho to the hydroxyl group. The following compounds represent preferred dihydroxyldiarylalkanes: 4-4'-dihydroxy2,2-diphenylpropane (bispheno A), tetramethylbisphenol A, tetrachlorobisphenol A, tetrabromobisphenol A, and bis-(4-hydroxyphenyl)-p-diisopropylbenzene.

In addition to using polycarbonates prepared from dihydroxydiarylalkanes alone, branched polycarbonates may be used that have been prepared by replacing a portion of the dihydroxy compound, for example 0.2–2 mol.%, with a polyhydroxy compound. Examples of suitable polyhydroxy compounds are 1,4bis(4',4,2'-dihydroxytriphenylmethyl)benzene, phloroglucinol, 4,6-dimethyl-2,4,6-tri(4hydroxyphenyl)-2-heptene, 4,6-dimethyl-2,4,6-tri(4hydroxyphenyl)heptane, 1,3,5-tri(4-hydroxyphenyl)benzene, 1,1,1-tri(4hydroxyphenyl)ethane, and 2,2-bis 4,4-(4,4'dihydroxydiphenyl)cyclohexyl propane. Polycarbonates of this type are, for example, described in U.S. Pat. Nos. 3,028,365, 2,999,835, 3,148,172, 3,271,368, 2,970,137, 2,991,273, 3,271,367, 3,280,078, 3,014,891 and 2,999,846.

Advantageously, if the polymer composition is required to have flame-retardant properties, the polycarbonate component can be wholly or partially formulated from halogenated polycarbonate.

The graft copolymers (components A and B) can be obtained by polymerizing styrene and acrylonitrile in the presence of a hydrocarbon rubber, preferably in emulsion. Various known polymerization techniques are suitable, including emulsion, suspension, bulk, and solution, or combinations thereof such as bulksuspension, emulsion-bulk, and emulsion-suspension. It is also feasible to prepare each graft copolymer by a different polymerization technique.

The copolymer (component C) of styrene and acrylonitrile is preferably prepared in emulsion or suspension, although the other polymerization techniques mentioned above may also be used.

Emulsion polymerization can be performed by the usual techniques, both for the graft copolymers A and B and for the copolymer C. If the polymerization is performed in aqueous emulsion it is necessary to use customary reagents including emulsifiers, alkali, salts, soaps, initiators such as peroxides, and chainlength regulators.

Suitable as chain-length regulators are organosulphur compounds such as the widely used mercaptans or the dialkyldixanthogens, diaryl sulphides, mercaptothiazoles, tetraalkylthiuram monosulphides and disulphides, etc., singly or in combination, and hydroxyl compounds such as the terpinolenes. The dimer of α-methylstyrene or of an α-alkene having a relatively long chain may also be used. The chain-length regulators most widely used commercially are the mercapto compounds, and of these the hydroxycarbyl mercaptans having 8-20 carbon atoms per molecule are particularly suited for use in the present invention. Mercaptans having a tertiary alkyl group are especially favorable.

The quantity of organosulphur chain-length regulator can vary within broad limits depending on the mixture chosen, the specific regulator, the polymerization temperature, the emulsifier, and other variables relating to the formulation. Good results can be achieved by using 0.01-5 parts by weight (per 100 parts by weight of the monomers) of the organosulphur regulator, 0.5-2 parts by weight of the organosulphur regulator being the preferred range. Suitable organosulphur compounds include N-octylmercaptan, n-dodecylmercaptan, tert.dodecylmercaptan, tert.nonylmercaptan, tert.hexadecylmercaptan, tert.octadecylmercaptan, tert.eicosylmercaptan, sec.octylmercaptan, sec.tridecylmercaptan, cyclododecylmercaptan, cyclododecadienylmercaptan, arylmercaptans such as lnaphthalenethiol etc., bis(tetramethylthiuram disulphide), 2-mercaptobenzathiazole, and the like. Mixtures of these compounds can also be used.

The emulsifier may be selected from a very wide range of compounds such as disproportionated rosin soap, fatty acid soap, mixtures of these compounds, arylsulphonates, alkylarylsulphonates and other surface-active compounds, and mixtures of these compounds. Nonionic emulsifiers such as polyethers and polyols may also be used. The quantity of the emulsifier used depends on the types, reaction parameters, and concentrations of the polymerizable monomers in the emulsion polymerization system.

Suitable donors of free radicals to initiate the emulsion polymerization process are organic or inorganic peroxides, hydroperoxides, azo compounds, and redox initiator systems. The initiator can be added at the start of the polymerization or, alternatively, it may be added partly at the start and partly during the course of the polymerization.

Preferred initiators are alkali or ammonium per-salts and/or redox systems. Particular per-salts that may be mentioned are potassium persulphate, ammonium persulphate, and sodium persulphate. Examples of suitable redox systems are per-salts (for example perchlorates or persulphates), tert.butylhydroperoxide, cumene hydroperoxide, diisopropylbenzene hydroperoxide and methylcyclohexyl hydroperoxide, in combination with reducing agents based on acids that contain sulphur in a low valence state, such as sodium formaldehydesulphoxylate, bisulphide, and pyrosulphide, or with organic bases such as triethanolamine, or with dextrose, sodium pyrophosphate, and mercaptans, or their combinations, possible together with metal salts such as ferrous sulphate. The initiator or initiator system may be added as a single addition, in a number of stages, or even gradually but continuously.

The rubber for the preparation of the graft copolymers A and B may in principle be of any type. However, it is advantageous to use budadiene-based rubbers such as polybutadiene and butadiene styrene rubber. To obtain a polymer composition which exhibits good impact strength, it is desirable to use a rubber latex having a weight-average particle size (d50, determined with an electron microscope) between 0.5 and 0.7 $\mu$m. In this case the graft copolymer must be prepared at least partly in emulsion.

The process by which the rubber latex is prepared is preferably controlled in such a way that highly cross-linked products result. The gel content (determined in methyl ethyl ketone or toluene) should preferably be greater than 70 weight %. At high levels of butadiene in the rubber this degree of cross-linking can be achieved either by polymerizing to a high degree of conversion or by using cross-linking agents, i.e. polyfunctional monomers, such as divinylbenzene or ethylene glycol dimethacrylate.

If the graft copolymerization is conducted via a route that does not involve emulsion polymerization, rubbers that are made from solutions in organic solvents may also be used. In that case, however, it is desirable to conduct the reaction as a bulksuspension polymerization.

In those cases wherein the rubbers are prepared by emulsion polymerization, the same emulsifiers, activators, and polymerization auxiliaries that are used in the preparation of the α-methylstyrene-acrylonitrile copolymer C can be used. Before the grafting reaction the rubber latex should be degassed to prevent undesirable reactions of unconverted monomer.

Preferred rubbers are polybutadiene homopolymers or butadiene copolymers having a butadiene content which exceeds 60 weight %. If other dienes, such as isoprene, or the lower alkyl esters of acrylic acid are used as comonomers, however, the butadiene content of the rubber may be lowered to a minimum of not less than 30 weight % without any adverse effect of the properties of the polymer composition. In principle it is possible as well to prepare the graft polymers A and B from saturated rubbers, for example from ethylenevinyl acetate copolymers having a vinyl acetate content of less than 50%, from ethylenepropylene-diene terpolymers (these dienes are not conjugated; examples are 1,4-hexadiene, ethylidene norbornene, and dicyclopentadiene), or from acrylate rubber, chlorinated polyethylene rubber, or chloroprene rubber. Mixtures of two or more rubbers can also be used.

If the copolymer C or the graft copolymer A or B is prepared in suspension, the usual additives are used, such as suspension stabilizers, free radical donating substances, chain transfer agents and the like.

The various components of the polymer composition may be mixed as known in the art, depending on the form in which they are available. If all components are solid, such as powder, beads or granulate they are advantageously blended in an extruder, having one or two screws, optionally provided with means to effect degasification. If two or more components are prepared by the same polymerization technique, for example by emulsion polymerization it may be advantageous to combine them at an early stage prior to the recovery of the component from the reaction mixture, and then to recover the components together.

A further method of compounding is described in British Patent Specification No. 1,586,910 according to which the components are dissolved or suspended in a solvent such as chlorobenzene. From the resulting solution or suspension the polymer composition can be recovered.

According to this invention various combinations of the graft copolymer components A and B may be used. According to a preferred embodiment 50–95 weight % of A is combined with 5–50 weight % of B (based on the weight of A+B). The rubber content of A is preferably between 20 and 50 weight %, in which case the rubber content of B is preferably between 10 and 20 weight %.

A preferred embodiment of the invention additionally resides in the method wherein graft copolymer A is prepared by polymerizing 50–70 parts by weight of monomers in the presence of 50-30 parts by weight of rubber. In another preferred embodiment of the invention, optionally in combination with the above preferred embodiment for graft copolymer A, the rubber content of graft copolymer B is between 15 and 20 weight %.

The preferred weight ratio of polycarbonate to the total of components A, B and C is between 5 to 95 and 95 to 5. Weight ratios between 40 and 60 and 75 to 25 are particularly favorable.

The total rubber content of the polymer composition, based on the weight of said composition, is advantageously from about 5 to about 30 weight %, and most preferably from about 10 to about 20 weight %. A polymer composition having a rubber content within these limits exhibits a good impact strength even at very low temperatures, and exhibits this property in combination with good processing capabilities.

The graft copolymers A and B are preferably obtained by polymerizing sytrene and acrylonitrile in the presence of a butadiene rubber. It may, however, be advantageous to replace the styrene in whole or in part by α-methylstyrene for an application requiring enhanced heat resistance. For such an application it would also be advantageous to use a copolymer of acrylonitrile and α-methylstyrene as the copolymer component C. It is also possible, however, to achieve the same effect by combining the partial replacement of styrene by α-methylstyrene in one or both graft copolymer components with the partial replacement of styrene by α-methylstyrene in the copolymer component C.

Customarily it is preferred to prepare the copolymer of styrene and/or α-methylstyrene and acrylonitrile separately from the graft copolymer. Under certain circumstances, it can, however, be useful to have only the copolymer present that is prepared during the graft polymerization.

The composition may contain various additives such as stabilisers, flameretardants, antistatic agents, lubricants, pigments and the like.

The compositions detailed by this invention have been used to fabricate, in whole and in part, shaped articles which exhibit excellent properties of impact strength over a wide temperature range, hardness, and stiffness. The invention will now be illustrated by some examples.

EXAMPLES I AND II

Two compositions, I and II were prepared as follows. First, graft copolymer A was obtained by polymerizing 65 parts by weight of a mixture of 70 weight % styrene and 30 weight % acrylonitrile in the presence of 35 parts by weight of butadiene rubber. Also, graft polymer B was obtained by polymerizing 84 parts by weight of a mixture of 70 weight % styrene and 30 weight % acrylonitrile in the presence of 16 parts by weight of butadiene rubber. The two polymer compositions I and II were prepared using A and B. These compositions additionally contained a polycarbonate D made from bisphenol A and phosgene; and a copolymer C composed of 70 weight % styrene and 30 weight % acrylonitrile. They were prepared in a ZSK double screw extruder by meltmixing at about 240° C. The compositions I and II additionally contained the conventional additives. The proportions of the components and the mechanical properties of the compositions are given in table 1.

TABLE 1

| Components and Properties of Compositions I and II | | |
|---|---|---|
| | (Parts By Weight) | |
| | I | II |
| Component | | |
| Graft Copolymer A | 16 | 10 |
| Graft Copolymer B | 10 | 5 |
| Copolymer C | 24 | 15 |
| Polycarbonate D | 50 | 70 |
| Properties | | |
| Melt index | 8 | 6 |
| Impact strength | 457 | 600 |
| (Izod, J/m) | | |
| (Charpy notched, mJ/mm 2) | 20 | 33 |
| Flexural strength (N/mm 2) | 110 | 103 |
| E-modulus (N/mm 2) | 2500 | 2570 |
| Vicat (5 kg, °C.) | 119 | 131 |

EXAMPLES III AND IV

In these examples the polymer compositions were the same as described above for I and II, except that copolymer C was replaced by a copolymer of 70 weight % α-methylstyrene and 30 weight % acrylonitrile. The results were comparable to those given in Table 1, the only significant difference being that the Vicat softening points were, respectively, 126° and 136° C.

EXAMPLES V-VII AND COMPARATIVE EXAMPLE A

Using the same components as detailed for Examples I-II, four compounds were prepared, having the proportions shown in Table 2. The compounds were prepared using a ZSK-twin screw extruder and a melt temperature of about 240° C.

TABLE 2

| Components and Properties Of Compositions V-VII and Comparative Example A | | | | |
|---|---|---|---|---|
| | Parts by Weight | | | |
| | V | VI | VII | A |
| Component | | | | |
| Graft Copolymer A | 30 | 27 | 27 | 34 |
| Graft Copolymer B | 10 | 10 | 10 | — |
| Copolymer C | 15 | 13 | 8 | 16 |
| Polycarbonate D | 45 | 50 | 55 | 5 |
| Total Rubber content of composition in weight % | 14 | 12 | 12 | 12 |
| Properties | | | | |

TABLE 2-continued

| Components and Properties Of Compositions V-VII and Comparative Example A | | | | |
|---|---|---|---|---|
| | Parts by Weight | | | |
| | V | VI | VII | A |
| Melt index (26° C., 1 kg) | 4.5 | | | |
| Impact strength (Izod, notched in kJ/mm 2) | | | | |
| 23° C. | 49 | 54 | 65 | 52 |
| 0° C. | 41 | 43 | 55 | 42 |
| −40° C. | 17 | 21 | 25 | 20 |
| Vicat B (5 kg, °C.) | 113 | 113 | 120 | 113 |
| Spiral Flowlength* (cm, 4° C.) | 93.5 | 91.5 | 83.5 | 87.6 |

(*flat spiral 3 × 20 mm, injection pressure 1060 Bar, temperature 260° C.).

Specific synthesis methods for the materials usable in the foregoing formulations are as follows:

The Polycarbonate

To a solution of 20 parts by weight of sodium hydroxide in 250 parts of water 57 parts by weight of 2,2-(4,4'-dihydroxy-diphenyl)-propane are suspended. A clear solution is formed. After the addition of 22 parts by weight of a mixture of xylene isomerides and 0.0026 parts by weight of phenol, 6 parts by weight of phosgene are introduced into the solution at 30° C., with stirring and cooling. The mixture is then simultaneously treated with 31.5 parts by weight of phosgene and 21 parts by weight of sodium hydroxide in 62 parts of water in the course of 1½ hours. The mixture is subsequently stirred at 80° C. For 1 hour, the colorless granular product obtained is filtered off with suction and washed until neutral. The colorless product obtained melts at 225°–227° C. into a highly viscous state. The K-value is 77, corresponding to a relative viscosity of 1.775, measured in M-cresol at 25° C.

The Graft Copolymer A and B 70 parts by weight of a polybutadiene latex, having a solids content of 50 wt. %, and 45.5 parts by weight of styrene, and 19.5 parts by weight of acrylonitrile, and 0.2 parts by weight of tert. Dodecylmercaptane were all added to a reactor containing 135 parts by weight of water and 2.0 parts by weight of a 15 wt. % wood-rosin emulsifier solution.

After heating the reactor contents to approximately 45° C., 0.4 parts by weight of cumenehydroperoxide and activator system were added, and the polymerization started. Due to the heat generated during the reaction, the temperature of the reactor contents increased to 90° C.

When the temperature had reached 90° C., the reactor contents was slowly cooled.

Thereafter, the latex of graft copolymer was coagulated with MgSO₄, washed, filtered and dried.

Graft copolymer B can be prepared using the same recipe, however changing the respective amounts of reactants. Likewise the copolymer C can be prepared using the same procedure, deleting the polybutadiene latex.

It will be appreciated by those skilled in the art that this invention may be practiced with many variations from the foregoing examples but within the spirit of the disclosure hereinabove and as defined by the following claims.

What is claimed is:

1. A polymer composition based on a polycarbonate and a graft copolymer of a vinyl aromatic compound and an unsaturated nitrile compound on a rubber-like polymer, wherein said composition consists essentially of:

A. at least one graft copolymer obtained by polymerizing 40–80 parts by weight of a monomer mixture, which mixture consists of:
(1) 20–40 weight % of acrylonitrile, and
(2) 60–80 weight % of styrene, in the presence of 20–60 parts by weight of a hydrocarbon rubber, B. at least one graft copolymer obtained by polymerizing 75–90 parts by weight of a monomer mixture, which mixture consists of:
(1) 20–40 weight % of acrylonitrile, and
(2) 60–80 weight % of styrene, in the presence of 10–25 parts by weight of a hydrocarbon rubber, C. a copolymer obtained by polymerizing 20–40 parts by weight of acrylonitrile with 60–80 parts by weight of styrene, and D. at least one polycarbonate, wherein all based on the weight of the composition, the total rubber content is from about 5 to about 30 weight % and the difference in rubber content between components A and B is at least 5 weight %.

2. The composition of claim 1 wherein either monomer mixture used to form graft copolymer components A and B further contains up to 20 weight %, based on the mixture, of at least one additional monomer.

3. The polymer composition of claim 1, wherein said composition consists of:
a. 5–95 weight % of polycarbonate and
b. 5–95 weight % of the components A, B, and C.

4. The polymer composition of claim 2, wherein said composition consists essentially of:
a. 40–75 weight % of polycarbonate and
b. 25–60 weight % of the components A, B, and C.

5. The polymer composition of claim 1, wherein said polycarbonate is based on a nonhalogenated dihydroxydiarylalkane.

6. An article prepared wholly or partially from the polymer composition of claim 1.

* * * * *